United States Patent [19]

Tolomeo, Sr.

[11] Patent Number: 4,487,479
[45] Date of Patent: Dec. 11, 1984

[54] HUNTER'S REAR VIEWING MIRROR DEVICE

[76] Inventor: Joseph F. Tolomeo, Sr., 19 Marycrest Dr., Pittsburgh, Pa. 15235

[21] Appl. No.: 474,200

[22] Filed: Mar. 10, 1983

[51] Int. Cl.³ .............................................. G02B 5/08
[52] U.S. Cl. ..................................... 350/615; 350/639
[58] Field of Search ............... 350/304, 303, 306, 305, 350/298

[56] References Cited

U.S. PATENT DOCUMENTS

| | | | |
|---|---|---|---|
| 664,365 | 12/1900 | Williamson | 350/298 |
| 2,802,394 | 8/1957 | Krone | 350/304 |

Primary Examiner—Jon W. Henry
Attorney, Agent, or Firm—Parmelee, Miller, Welsh & Kratz

[57] ABSTRACT

A mirror device has been developed for use by hunters that are hunting game, such as deer, and desire to not only cover a front area, but without movement of the body or head, to readily cover the rear area at a selected standing or sitting location. A three-part mirror construction having a central part and a pair of endwise-swingably mounted side mirror parts is constructed to enable the side parts to be swung from a collapsed, pocket-carrying, protected face to face position on the central mirror part to an angular or to a substantially planar endwise extending position with respect to the central mirror part. The device is adapted to be secured in position from the back of its central mirror part by adjustable strap means that at its ends is detachably connected thereto. A pair of vertically spaced-apart and a pair of horizontally spaced-apart pivoted rings are carried by the back support frame for alternative clip-on usage of the strap means. The rings are adapted to receive the ends of the adjustable strap in such a manner as to enable the encirclement of a substantially vertical above-the-ground support, such as a tree trunk or pole, as well as a substantially horizontal support, such as a tree limb or cross member. Finger means are provided in a spaced-apart relation along upper and lower rim edge portions of the frame of the central mirror part for slidable pivotal movement backwardly into aligning engagement with the above-ground support to provide for an accurate desired positioning of the device with respect thereto.

15 Claims, 7 Drawing Figures

U.S. Patent    Dec. 11, 1984    4,487,479
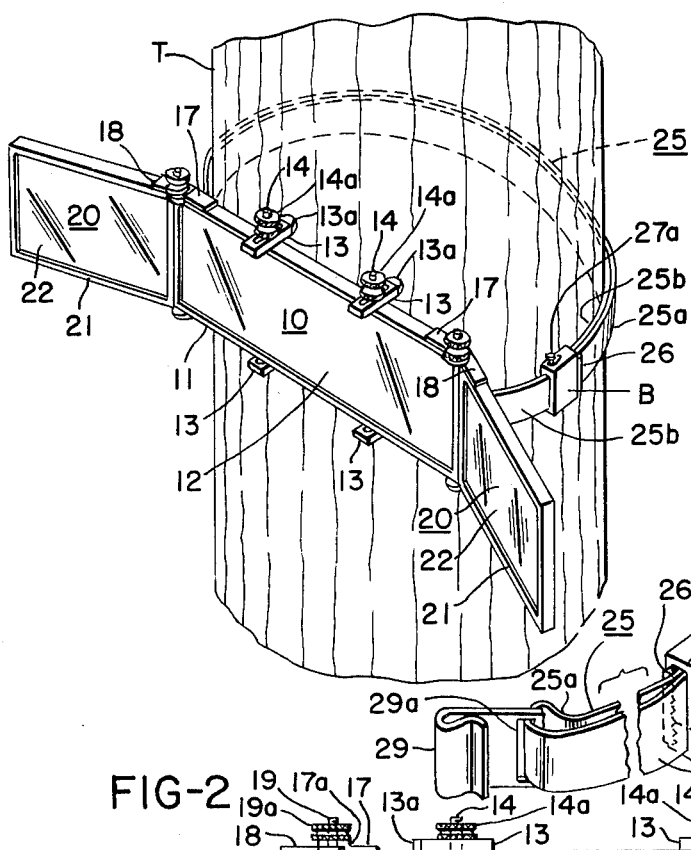
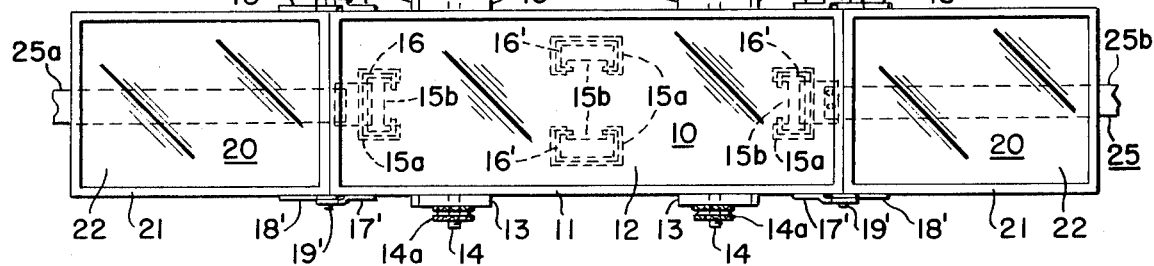
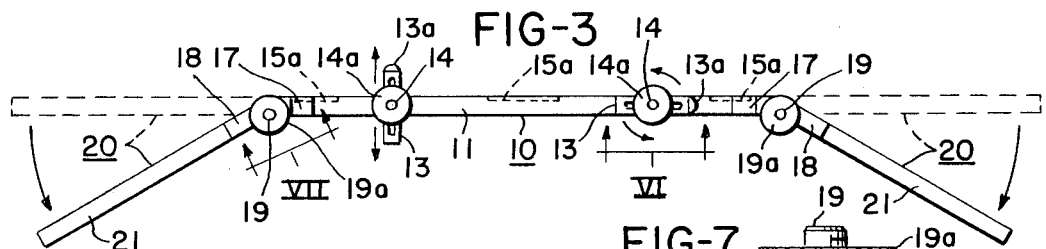
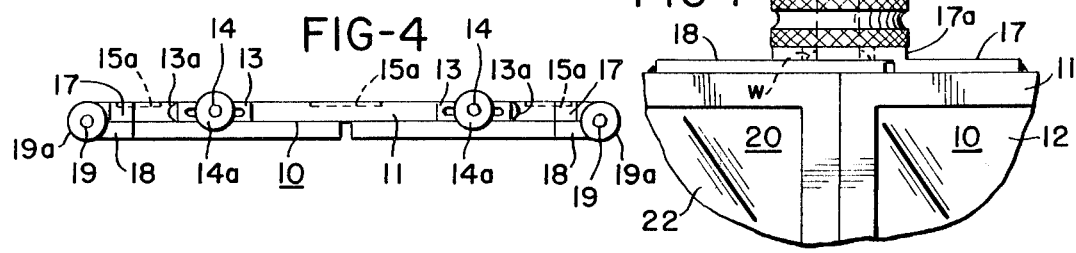

HUNTER'S REAR VIEWING MIRROR DEVICE

There has been a need for a mirror device which can be carried in the pocket of a hunter in a compact or collapsed relation and then taken out and quickly secured and fully adjustably mounted on a handy support to the end that the hunter will not have to physically hold the mirror while he is carrying his gun at a "ready" position or while he has taken a stationary waiting or "stand" for the purpose of sighting and shooting wild game, such as deer, bear, moose, etc. It is important to provide a device that can be minutely adjusted to an exact position, for not only covering a central back area, but for covering an adjacent side area when the hunter is in a comfortable position, and without the need for the hunter's use of his hands or of moving his body to thus give away his presence to the animal.

The present device has been devised to provide a maximum central back mirror viewing, as well as a good side mirror viewing, and to enable an adjustment of mirror parts and a retention of such mirror parts in a most desirable stationary, back viewing position for the hunter. As far as known, there are no devices at the present time which fully meet this need, although it is recognized that hand-held mirrors have been provided with foldable sight parts, and other mirrors have been provided for household use that are adapted to be mounted on a swinging door of a cupboard, etc. However, it is believed that I have been the first to provide a mirror device which will take advantage of limbs, branches, trunks or tree or other outdoor above-ground supports for mounting and rear viewing by a hunter and which will accurately enable the best possible back viewing coverage of the area in which the hunter is stationed, all in such a manner that the hunter has his hands and other body parts free for accurate usage of his gun and for avoiding unnecessary movement which might give away his position to an animal that is being hunted.

FIELD OF THE INVENTION

It has thus been an object of the present invention to meet a problem which has been presented in connection with the hunting of wild animals and particularly, from the standpoint of enabling maximum viewing coverage of a given area with minimized body movement and without strain from the standpoint of the hunter.

Another object of the invention has been to provide a back view hunter's mirror device that can be collapsed into a compact package for storage and carrying in the coat of a hunter and that, at the same time, will enable a wide back area viewing coverage.

A further object of the invention has been to provide a back viewing mirror device which may be easily and securely mounted at a suitable above-ground viewing height on an above-ground support, such as a tree, limb or trunk and, at the same time, in a quickly detachable and adjustable relation with respect thereto.

A still further object of the invention has been to provide a rear viewing hunter's mirror device whose parts are swingably adjusted from a side viewing standpoint, as well as from a horizontally tilted relation with respect to an above-ground support.

These and other objects of the invention will appear to those skilled in the art from the illustrated embodiment of the claims.

THE DRAWINGS

In the drawings;

FIG. 1 is an elevation showing a viewing device of the invention in a suitable adjustably mounted and secured relationship on a vertically extended pole or tree trunk; it illustrates one type of mounted relationship that may be utilized;

FIG. 2 is a front view in elevation on an enlarged scale and of the device of FIG. 1;

FIG. 3 is a horizontal or top edge view on the scale of and of the device of FIG. 2, showing hinged side mirror parts in an adjusted angular relation with respect to a central or main mirror part thereof; such a relation may be attained as indicated in FIG. 1 for a desired complete viewing of a rear area or landscape;

FIG. 4 is a top edge view of the device of FIGS. 1, 2 and 3, showing its side mirror parts in a folded-in or collapsed relationship for convenience of carrying or transport;

FIG. 5 is a greatly enlarged fragmental back view taken partially in section, and showing how an end of a mounting strip may be removably carried by a mounting ring that pivotally extends from a well or depression within the back wall of the main mirror part of the device;

FIG. 6 is an enlarged fragment taken along the line VI—VI of FIG. 3, showing details of the construction and mounting of positioning finger or spacer elements that extend from bottom edges or rails of the frame of the main mirror part; they provide a suitable top and bottom or horizontal tilt type of adjustment of the device from the standpoint of a tree trunk, limb, pole or other stationary mounting means, such as T of FIG. 1;

And, FIG. 7 is an enlarged fragmental section taken along the line VII—VII of FIG. 3, illustrating a pivoted mounting and locking construction of hinge means between the main or central mirror part and endwise extending pair of side mirror parts of the device.

DESCRIPTION OF THE PREFERRED EMBODIMENT

Referring to FIG. 1 of the drawings, a device of the invention is shown mounted on a vertical support, such as a tree T. It has a central or main mirror part 10 shown of horizontally extending rectangular shape and having a supporting frame 11. The frame 11, as shown in FIGS. 1, 3 and 5, has a planar back portion 15 and encircling rim edge portions which carries a conventional mirror 12 which may be of lightweight plastic, coated glass or of metal construction. The longitudinally extending upper and lower rims of the frame 11 carry upper and lower, longitudinally spaced-apart pairs of slotted abutment or mirror tilting fingers 13 for pivotal, as well as slide adjustment thereon. A threaded stud 14 is secured as by weld metal, cement or brazing metal w to extend upwardly from the rims, as shown in FIG. 6, through the slot in each finger 13 to receive a relatively large knurled adjustment nut 14a. In this manner, the loosening of the nut 14a will enable each finger 13 to be advanced towards and away from the support T along its slot, and to be thereafter secured in a desired inwardly extending, support-abutting position by tightening-down its associated nut 14.

The end of each finger 13 is provided with a rounded abutment tip 13a which may be of rubber or resin material. The fingers 13 thus enable the device and directly enable the central mirror part 10 to be pivoted horizontally with respect to the support T, as well as vertically with respect thereto; it enables one end portion of the device to be pivoted with respect to the other end portion thereof. Thus, a highly effective and properly aligned efficiency of sighting or back and side viewing can be attained.

A pair of side view mirrors 20 are also shown of rectangular section and are swingably attached to opposite ends of the main or central part 10. As shown particularly in FIGS. 2 and 7, upper and lower hinge tabs 18 and 18′ extend endwise from a rim portion of a back supporting frame 21 of each side mirror part 20 in a planar relation, under upper and lower, outwardly offset or overlapping portions 17a of hinge tabs 17 and 17′ that are attached, as by weld metal, cement or brazing metal w to the rim of the support frame 11. A threaded stud 19 is secured, as by weld metal w, to the upper hinge part 18 to extend through a bore hole in the cooperating part 17 to receive an adjustment and locking, knurled nut 19a thereon. A non-threaded stud 19 is secured in a like manner to the lower tab 18′ to extend through a bore hole in the cooperating lower tab 17′. This construction enables the side view mirror part 20 to be swung to any suitable angular position when the nuts 19a are loosened and then to be secured in such a position by tightening them down.

With particular reference to FIGS. 1, 2 and 5, the frame 11 of the main frame part 10 is provided with two sets or pairs of mounting rings 16, 16′ for a belt-like strap assembly 25. One vertically spaced-apart pair of mounting ring 16′ enables the strap assembly 25 to be used about a substantially horizontally extending, above-ground, fixed support, while a horizontally spaced-apart pair 16 enable the strap assembly 25 to, as shown in FIG. 1, to be adjustably secured in position about a vertical above-ground support T.

Each mounting ring means pair 16, 16′ is of the same construction and comprises a U-shaped, swingable ring 16 or 16′ whose inturned ends are pivotally or swingably carried within a mounting shoulder 15b of a slot or recessed inward offset 15a within the planar back wall portion 15 of the support frame 11. The recesses 15a are of sufficient size and depth to enable each swing ring 16 to be swung to a collapsed, fully flush position within the recess 15a and with respect to the outer face of the back wall portion 15. The adjustable strap 125 which may be of weblike fabric, of leather or resin construction, has an interleaving or fold-over portion which passes, in a slidable adjustable relation, through a closed-off end slot 29a in a clamp-on mounting bracket 29. The bracket 29 as shown in FIG. 5 has a spring-like leaf portion which is adapted to be sprung into and out of a latching position on an associated mounting ring 16 or 16′.

As shown in FIG. 5, one overlapping length portion 25b of the strap 25 is secured as by rivets 31 to a second mounting bracket 30 which also has a spring-like leaf portion that is adapted to be forced under pressure into and out of a latching position on an associated mounting ring 16 or 16′. The extending end of the strap length portion 25a is secured, as shown in FIG. 5, by a saw toothed, pivoted clamp 26 carried by a belt-like buckle B. The buckle B, at its front end, carries a knurled cross-extending pin 27 that is provided with heads 27a that mount it in a slidable position within slanted side slots 28. This enables the buckle B to be slid along the portion 25b of the strap 25 to thus adjust its diameter to a suitable size for the particular above-ground support that is to be used.

I claim:

1. A hunter's rear viewing mirror device for secure, removable and adjustable mounting at a suitable viewing height on an above-ground support such as a tree trunk or limb which comprises, a central mirror part and a pair of endwise mounted side mirror parts, each of said mirror parts having a mirror and a supporting frame, means swingably mounting said pair of side mirror parts on opposite ends of said central mirror part, means cooperating with said swingable means for retaining said side mirror parts in a desired adjusted endwise-tilted relation with respect to said central mirror part, strap mounting means secured to a back side of the supporting frame of said central mirror part, and an adjustable strap means adapted to be secured to said mounting means to extend in a secure relation about the support at a suitable above-ground height for mounting said mirror parts in a suitable back-viewing position for the hunter.

2. A hunter's mirror device as defined in claim 1 wherein, a pair of said strap mounting means is secured on the back side of the support frame of said central mirror part for carrying said strap means in a horizontally extending relation about a substantially vertically extending above-ground support, and a second pair of said strap mounting means is secured on the back side of the supporting frame for said central mirror part at substantially right angles with respect to said first-mentioned pair of said strap mounting means for carrying said strap means in a horizontally extending relation about a substantially horizontal above-ground support, and said adjustable strap means has means for removably and alternately securing its opposite ends to either said first or said second pair of mounting means.

3. A hunter's mirror device as defined in claim 1 wherein, spring clamps are adapted to removably secure opposite ends of said strap means to said strap mounting means, and slidable means is carried by said strap means for adjustably securing said strap means in a mounted relation about the above-ground support.

4. A hunter's mirror device as defined in claim 1 wherein tilt finger means is adjustably mounted on an edge portion of the supporting frame for said central mirror part to tiltably adjust said central mirror part about a horizontal axis with respect to the above-ground support.

5. A hunter's viewing mirror device as defined in claim 1 wherein, the supporting frame of said central mirror part has a rim portion extending therealong, and tilt finger means is mounted on said rim portion for in and out adjustable movement between said central mirror part and the above-ground support when the device is mounted by said strap means on the above-ground support.

6. A hunter's viewing mirror device as defined in claim 5 wherein, each said tilt finger means comprises a finger having a slotted portion therealong, threaded studs are secured to project from said rim portion of said central mirror part and extend through said slotted portions of said fingers for enabling pivotal and in and out sliding movement of said fingers on said rim portion, and nuts are mounted on an extending end portion of each of said studs for securing said fingers in an adjusted relationship with respect to said rim portion.

7. A hunter's viewing mirror device as defined in claim 1 wherein, the supporting frame of said central mirror part has upper and lower substantially horizontally extending rims therealong, a pair of horizontally spaced-apart tilt fingers are pivotally inwardly and outwardly adjustably mounted on said upper rim, a second pair of horizontally spaced-apart tilt fingers is mounted in the same manner on said lower rim, said tilt finger pairs are adapted to be swung to extend backwardly from said rims for adjusting the mounted relation of the device with respect to the support along a substantially horizontal axis and also adapted to be swung to an aligned relation with said rims when the device is not in use, and each of said tilt fingers has a rounded tipped end adapted to abut against the support when the device is adjusted by said fingers to a suitable mounted position with respect to the support.

8. A hunter's viewing mirror device as defined in claim 1 wherein, a pair of spring-pressed clamping brackets are provided, one of said clamping brackets is secured to one end of said strap means and the other of said brackets has a slot therein for receiving a looped-over portion of said strap means in an adjustably slidable relation therein, and said strap mounting means has a pair of spaced-apart rings carried by the backside of said supporting frame, and each of said clamping brackets has a leaf-like spring portion for detachably snapping it into and out of position over an associated one of said rings.

9. A hunter's viewing mirror device as defined in claim 8 wherein, two pairs of said rings are provided, one pair of said rings is mounted in a vertically spaced-apart relation on the back side of said supporting frame, and the other pair of said rings is mounted in a horizontally spaced-apart relation on the back side of said supporting frame for alternately receiving said clamping brackets to mount the device either on a substantially vertically or substantially horizontally extending support.

10. A hunter's viewing mirror device as defined in claim 9 wherein, the back side of said supporting frame has inward offsets adjacent said spaced-apart rings, and said rings are adapted to fold into said offsets when the device is dismounted from the support.

11. A hunter's viewing mirror as defined in claim 10 wherein each of said pair of said side mirror parts is about one half the length of said central mirror part, and said swingable means is adapted to swing said side mirror parts into a substantially planar collapsed position over said central mirror part when the device is dismounted from the support.

12. A hunter's viewing mirror device as defined in claim 1 wherein, the supporting frame for said central mirror part has upper and lower rim portions extending substantially horizonally therealong, a pair of tilt fingers is mounted in a spaced-apart relation on each of said rim portions, and said fingers have means adjustably mounting them on said rim portions for in and out and swingable adjustable movement with respect to and against the above-ground support, and each of said last-mentioned mounting means is provided with means for locking each of said fingers in a desired adjusted position on said rim portions.

13. A hunter's viewing mirror device as defined in claim 1 wherein, said supporting frame for said central mirror part has a substantially planar back wall portion with a pair of horizontally spaced-apart pivotal mounts adjacent cavities therein and a pair of vertically spaced-apart pivotal mounts adjacent cavities therein, said adjustable strap means has means at its ends for alternately removably attaching them to either said vertically or said horizontally spaced-apart pair of pivotal mounts to enable a mounting of the device on either a vertically extending or a horizontally extending above-ground support, and said pivotal mounts are foldable into the adjacent cavities when said strap means is removed.

14. A rear viewing mirror device as defined in claim 1 wherein said means for retaining is adapted to lock said side mirror parts in outwardly and inwardly swung positions with respect to said central mirror part and comprises, a pair of overlapping cooperating hinge portions, a threaded stud secured to and extending from one hinge portion of said pair through the other hinge portion of said pair, and a locking nut mounted on said stem and adapted to lock-engage the other hinge portion of said pair.

15. A rear viewing mirror device as defined in claim 1 wherein, said supporting frames for said central and side mirror parts are back frames of rectangular shape, said mirrors are of rectangular shape and are carried in a frontal secured relation on said frames by an edge-encircling rim part thereof, and said side mirror parts are adapted to fold backwardly upon and in a collapsed substantially parallel and adjacent edge-to-edge relation across the front of said central mirror part and with the mirrors of said side mirror parts in an opposed facing relation with respect to the mirror of said central mirror part.

* * * * *